April 14, 1970      J. H. JOHNSON      3,505,727
CONCEALED WELD CONSTRUCTION
Filed Feb. 14, 1967      2 Sheets-Sheet 1
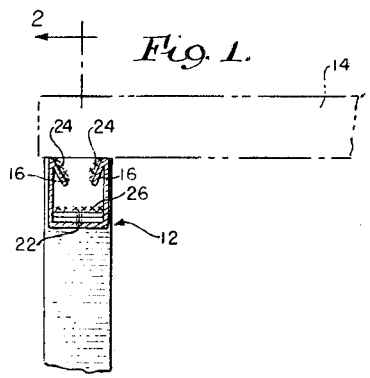
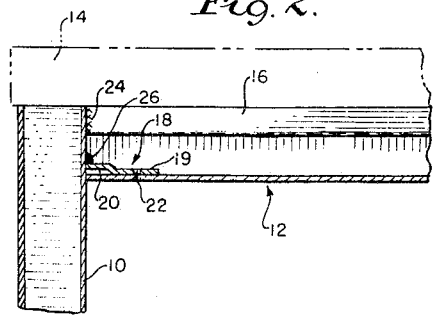
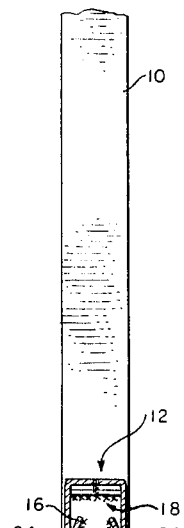
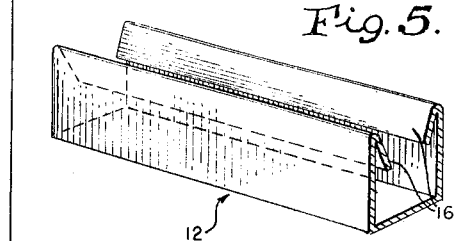
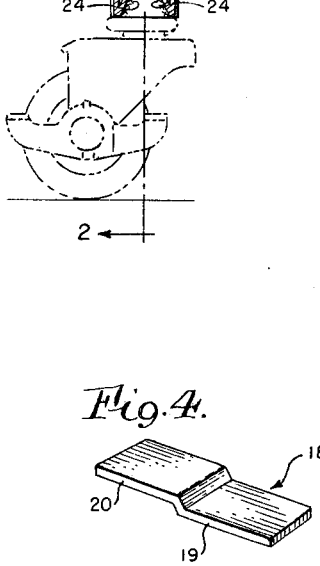
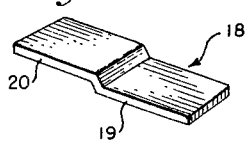
INVENTOR.
JOHN H. JOHNSON
BY
Bean, Brooks, Buckley + Bean
ATTORNEYS April 14, 1970  J. H. JOHNSON  3,505,727
CONCEALED WELD CONSTRUCTION
Filed Feb. 14, 1967  2 Sheets-Sheet 2
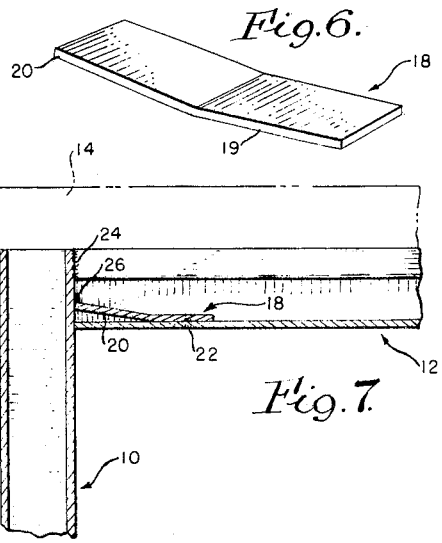
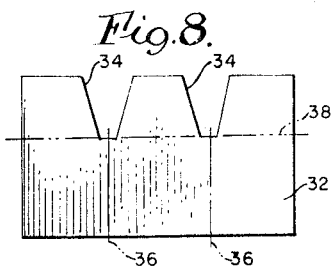
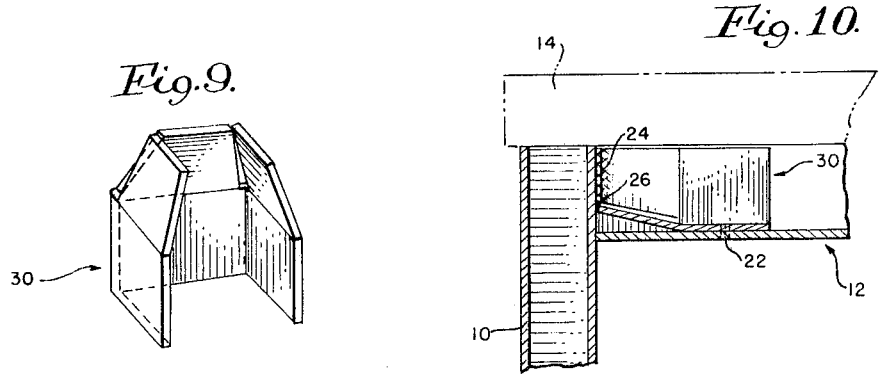
INVENTOR.
JOHN H. JOHNSON
BY
Bean, Brooke, Buckley & Bean
ATTORNEYS

United States Patent Office 3,505,727
Patented Apr. 14, 1970

3,505,727
CONCEALED WELD CONSTRUCTION
John H. Johnson, Jamestown, N.Y., assignor, by mesne assignments, to Clark Adams Corp., Chicago, Ill., a corporation of Delaware
Filed Feb. 14, 1967, Ser. No. 616,761
Int. Cl. B23k 21/00
U.S. Cl. 29—470.7   5 Claims

ABSTRACT OF THE DISCLOSURE

A welding means and method for use in constructing metal furniture joints or the like, providing a joint of superior mechanical strength while all evidences of welding heat disfigurement are confined within areas not normally viewable when the product is in use.

BRIEF SUMMARY OF THE INVENTION

This invention relates to furniture or the like, of the metal frame type; and more particularly to an improved welded frame structure and the manufacturing method thereof.

In the manufacture of furnature of the welded metal frame type typical production methods have been found to involve certain difficulties and disadvantages due to discoloration and/or other disfigurations of the metal parts during the welding processes. Hence the parts require subsequent refinishing, resulting in excessive fabrication costs and/or inferior quality products.

For example, in order to provide the framing members in the finished product with highly polished metal appearance in accord with prior manufacturing methods the structures are usually fabricated initially of unfinished metal stock by conventional welding processes; and then the frame (while in assembled form) is subjected to cleaning, anodizing, plating, and/or polishing operations. Thus, the finishing operations are performed under extremely adverse and disadvantageous conditions in that the welded-together and relatively bulky frame structures must be carried from place to place; dipped and drained; tumbled and turned through a variety of positions at a variety of processing stations; and/or otherwise handled for the sole purpose of remedying the ornamental disfigurations incurred during the parts welding processes. Thus, to "finish" the product to a satisfactorily cleaned and polished condition, such operations are obviously awkward, time-consuming, and expensive.

It is a primary object of the invention to provide an improved manufacturing system whereby to produce by simple and easily performed shop processes a product of improved appearance at substantially reduced cost. Other, more detailed, objects and advantages of the invention will appear from the specification hereinafter.

In the drawing

FIG. 1 is a fragmentary side elevational view partly in vertical section, of a metal frame structure comprising a "leg" and top and bottom "runner" components fabricated in accordance with the invention;

FIG. 2 is a fragmentary sectional view taken as suggested by line 2—2 of FIG. 1;

FIG. 3 is a top end perspective view on enlarged scale, of the leg member of the structure of FIG. 1;

FIG. 4 is a disassembled perspective view of a connection member of the frame joint assembly of FIGS. 1–2;

FIG. 5 is a fragmentary perspective view of the upper rail member of the structure of FIGS. 1–2;

FIG. 6 is a disassembled perspective view of a modified form of the connection clip member shown in FIG. 4;

FIG. 7 corresponds to the upper portion of FIG. 2, but illustrates the use of the form of connection device shown in FIG. 6;

FIG. 8 illustrates in plan view a formed blank from which a still further modified form of connection clip device may be fabricated;

FIG. 9 is a view in perspective of the modified form of connection device fabricated from the blank of FIG. 8; and FIG. 10 is a view corresponding to FIGS. 2 and 6, but illustrating the use of a connection clip device of the type shown in FIG. 9.

The present invention is applicable to the fabrication of any welded joint constructions between angularly abutting ornamental metal strut member or the like; and by way of example is shown herein in conjunction with the manufacture of a metal table or chair frame or the like comprising legs 10 and "runners" or "spreaders" 12—12; the upper runner being adapted to support a table top or the like as indicated at 14. Thus, the frame shown by way of example is of the type which may readily be fabricated of standard rectangular or square-sectioned metal tubing, welded together at the illustrated joint positions. Obviously, the same type construction may be used to fabricate chair frames, sofa frames, and a large variety of other furniture items.

The present invention contemplates, in lieu of the prior processing systems hereinabove described, a novel welded joint fabricating technique which avoids the production of any normally visible metal tarnishing or other disfiguration effects incidental to the fabrication of the requisite welded joints. Hence, the system of the present invention permits the use of metal stock pieces which have been pre-cleaned and plated and/or polished under ideal conditions and therefore at minimum expense; and which eliminates the heretofore requisite post-assembly welding cleaning and plating and/or polishing operations which have been heretofore so troublesome and expensive, as explained hereinabove.

For example, as shown in FIG. 1 herewith, a table may be constructed to comprise vertical legs 10 interconnected by spreaders 12 (either only at the top of the structure or both at the top and bottom thereof as shown) and supporting a table top plate 14. Thus, when the table is completed the table top element rests upon and covers the tops of the spreaders 12 which are butt-welded at their ends to the legs 10. Therefore, in accord with the present invention, the spreaders 12 are of novel design, as perhaps best shown in FIG. 5, to be essentially of open top channel-like form but to include inwardly disposed leg portions 16—16 fabricated by bending extensions of the side walls of the channels inwardly and downwardly into inclined attitudes within the otherwise open interiors of the spreaders. Note that as shown in FIGS. 1, 5, the legs 16 are spaced inwardly from the outside walls of the channel. A connection or "clip" member 18 (FIG. 4) formed by offset-bending a metal plate to provide a base portion 19 and an offset cap portion 20 is spot-welded to the bottom inner end portion of the rail 12 as indicated at 22 (FIG. 2) prior to plating and/or polishing or otherwise "finishing" to runner member 12.

To assemble the furniture frame structure the leg and runner are brought into relative alignment as shown in FIG. 2, and then the runner is butt-welded to the leg from above as indicated in FIGS. 1, 2, at 24, 24, 26. The welding process is easily performed from above and entirely within the open confines of the runner member. Thus it will be appreciated that all of the weld material is disposed within the interior of the channel member, and out of view. Therefore, it needs no subsequent "dressing down" as in the case of exposed welds. Also, the heat-tarnish effects of the weld are confined to the flanges 16, 16, of the runner and to the cap portion 20 of the clip 18; and to the rear surface of the leg member which is covered by the side walls of the runner member. Hence, heat-tarnish effects of the welding operation are out of view from any angle when the furniture is in use. Also, note that the weld zones between the flanges 16, 16, of the runner 12 and the rear face of the leg member 10 are angularly related, thereby providing a diagonal bracing effect for the structural connection.

Also, as shown in FIGS. 1, 2, bottom "runner" members 12 may be disposed in down-facing attitudes. Thus, in any case the non-ornamental open face portions of the spreaders will be turned away from view when the furniture is in use, and the ends of the spreaders will be butt-welded to the legs 10 of the furniture piece as explained hereinabove. The top plate 14 may of course be fastened to the leg and runner sub-assembly by any suitable means, not shown.

Thus it will be apparent that by virtue of use of the joint fabricating method hereof a joint of superior mechanical strength is provided while at the same time all evidences of welding heat disfigurement are confined within zones which are not in view when the product is put into use. This means that the assembly may be fabricated of stock pieces which have all been pre-finished under ideal conditions; that is, cleaned and plated or polished, as the case may be. For example, the stock pieces may be purchased in standard lengths and in perfectly pre-finished form, and then cut into proper lengths and assembled by the welding method described hereinabove. The product then needs no further finishing operations, and the savings in overall manufacturing cost are of course substantial. However, it will be appreciated that the frame parts may be cut from unfinished stock and interconnected by the method hereof, and subsequently painted or otherwise finished, if preferred.

As shown in FIGS. 6, 7, herewith, the connection clip member utilized in connection with the welding procedure may be of a form shown in FIG. 6 in lieu of the form shown in FIG. 4; it being understood that the cap or end portion 20 thereof in either case is disposed in spaced relation from the wall portion of the member 12 which is to be protected from heat tarnish effects when the weldment 26 is effected.

FIGS. 8, 9, 10, illustrate still another form of connection "clip" device for use in accord with the welding technique of the invention. In this case the clip member is designated generally at 30, and is of such construction as to be readily formed from a blank 32 as illustrated in FIG. 8. The blank is notched as indicated at 34—34 and then bent along the fold lines designated 36—36—38 to provide the clip structure shown in FIGS. 9 and 10. The clip device will then readily slip-fit into the interior of standard channel-shaped spreader 12, and may be spot-welded therein as indicated at 22 and then subsequently welded as indicated at 24, 26 to the leg structure 10; while avoiding heat tarnish effects thereon as explained hereinabove in connection with the clip devices illustrated in FIGS. 4 and 6.

Although the method of the invention has been described in detail only in connection with the fabrication of a table or chair leg and spreader joint construction or the like, it is applicable with equal facility to the fabrication of other similar type joints in connection with the manufacture of all types of welded metal furniture or the like; and thus it will be understood that although only a few forms of the invention have been illustrated and described in detail hereinabove, various applications may be made thereof without departing from the spirit of the invention or the scope of the following claims.

I claim:

1. The method of manufacturing a finished metal furniture frame structure including first and second strut-like pre-finished metal frame parts disposed and interconnected in welded relation in such manner as to obscure from view the weld material and welding-heat disfigurations of said pre-finished metal parts, said method comprising,
    providing a channel member with wall portions bent inwardly along a continuous length of the channel to an end of the channel so as to form a flap on each wall portion,
    disposing said channel member with said end in abutting relation with a surface portion of a second metal part,
    and welding the ends of the flaps to the abutting surface portions of said second metal part from inside the confines of said channel member,
    thereby avoiding the formation of any externally viewable weldments and/or weld heat tarnishing effects.

2. The method of making a finished metal furniture frame structure including first and second pre-finished metal frame parts disposed and interconnected in welded relation to obscure from view any weld material and welding-heat disfigurations of said pre-finished metal parts, said method comprising,
    (a) forming said first frame part of channel form having spaced apart walls defining an opening therebetween and flaps extending along continuous lengths of said walls to an end thereof and projecting angularly inwardly from said walls into the interior of said first frame part between said walls, and with said first frame part having an end surface to which the corresponding ends edges of said flaps extend,
    (b) forming said second frame part with a surface conforming to said end surface of said first frame part,
    (c) finishing said frame parts to impart a desired surface appearance thereto,
    (d) abutting said frame parts with said end surface of the first frame part and said surface of the second frame part disposed in abutting relation with that portion of said surface of the second frame part which abuts said end edges of the flaps being disposed between said walls of the first frame part so as to be hidden from view and,
    (e) joining the abutted frame parts by welding them together, only within the confines of the interior of said first frame part, along the lines of abutment between said flaps of the first frame part and the surface portion of the second frame part,
    thereby avoiding the formation of any externally viewable weldments and/or weld-heat tarnishing effects.

3. The method of making a finished metal furniture frame structure including first and second metal frame parts disposed and interconnected in butt-welded relation, said method comprising,
    fabricating a first metal frame part by fixing a Z-sectioned bracket member to the inside web surface of a pre-finished channel-shaped strut whereby to dispose one end of said bracket member longitudinally flush with the end of said strut and in spaced relation therefrom,
    disposing said fabricated frame part in end-butted relation with the side of a pre-finished second metal part,
    and welding the end of said bracket member to the abutting surface portion of said second part from inside the open confines of said first part,
    thereby avoiding the formation of any externally viewable weldments and/or weld-heat tarnishing effects.

4. The method of making a finished metal furniture frame structure including first and second metal frame parts disposed and interconnected in butt-welded relation, said method comprising,
    fabricating a first metal frame part by fixing one portion of an angularly bent bracket member to the inside web surface of a pre-finished channel-shaped strut whereby to dispose another end portion of said bracket member to terminate flush with the end of said strut and in spaced relation therefrom,
    disposing said fabricated frame part in end-butted relation with the side of a pre-finished second metal part, and welding the end of said bracket member to the abutting surface portion of said second part from inside the open confines of said first part, thereby avoiding the formation of any externally viewable weldments and/or weld-heat tarnishing effects.

5. The method according to claim 2 including, subsequent to step (a), the step of securing a bracket member within the interior of said first frame part and to include an end portion projecting to said end surface of the first frame part between said walls thereof, so as to abut said portion of the surface of said second frame part between said walls, and incidental to step (e), welding said bracket member to said second frame part along said end portion of the bracket member.

References Cited

UNITED STATES PATENTS

| | | | |
|---|---|---|---|
| 2,352,501 | 6/1944 | Slavicek | 29—475 XR |
| 2,355,621 | 8/1944 | Brown | 29—475 |
| 3,058,209 | 10/1962 | Nijhuis et al. | 29—475 XR |
| 3,236,341 | 2/1966 | Chopinet et al. | 29—475 XR |

JOHN F. CAMPBELL, Primary Examiner

R. B. LAZARUS, Assistant Examiner

U.S. Cl. X.R.

29—472.1, 475